US009570991B2

(12) United States Patent
Akutagawa et al.

(10) Patent No.: US 9,570,991 B2
(45) Date of Patent: Feb. 14, 2017

(54) BIDIRECTIONAL DC/DC CONVERTER

(71) Applicant: Panasonic Intellectual Property Management Co., Ltd., Osaka (JP)

(72) Inventors: Yuichi Akutagawa, Hyogo (JP); Hideki Tamura, Shiga (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/785,592

(22) PCT Filed: Apr. 17, 2014

(86) PCT No.: PCT/JP2014/002178
§ 371 (c)(1),
(2) Date: Oct. 19, 2015

(87) PCT Pub. No.: WO2014/174809
PCT Pub. Date: Oct. 30, 2014

(65) Prior Publication Data
US 2016/0072390 A1  Mar. 10, 2016

(30) Foreign Application Priority Data
Apr. 26, 2013 (JP) .................. 2013-093277

(51) Int. Cl.
*H02M 3/335* (2006.01)
(52) U.S. Cl.
CPC ..... *H02M 3/33507* (2013.01); *H02M 3/33584* (2013.01); *Y02B 70/1433* (2013.01)

(58) Field of Classification Search
CPC .................................................. H02M 3/335
See application file for complete search history.

(56) References Cited

U.S. PATENT DOCUMENTS 7,848,118 B2 * 12/2010 Shimada ........... H02M 3/33584
363/127
2004/0179381 A1  9/2004 Eguchi et al.
(Continued)

FOREIGN PATENT DOCUMENTS

JP      2004-282828 A    10/2004
JP      2005-176499 A    6/2005
(Continued)

OTHER PUBLICATIONS

International Search Report for corresponding International Application No. PCT/JP2014/002178 mailed Jun. 17, 2014.
(Continued)

*Primary Examiner* — Emily P Pham
(74) *Attorney, Agent, or Firm* — Renner, Otto, Boisselle & Sklar, LLP (57) ABSTRACT

During a dead time, a resonance current generated by a load current that flows in a resonance inductor and a resonance current generated by an excitation current of a transformer flow in a resonance circuit constituted by the resonance inductor and capacitors that exist in parallel to respective switching elements. A controller performs a turning off operation on the switching elements at a timing that the resonance current generated by the load current and the resonance current generated by the excitation current are cancelled each other during the dead time.

3 Claims, 3 Drawing Sheets

(56) References Cited

U.S. PATENT DOCUMENTS

2007/0070655 A1\* 3/2007 Eguchi .................... H02M 1/10
                                                               363/17
2008/0186742 A1    8/2008 Seong
2014/0334189 A1\* 11/2014 Yan ................... H02M 3/33584
                                                               363/17

FOREIGN PATENT DOCUMENTS

| JP | 2006-230075 A | 8/2006 |
| JP | 2007-006653 A | 1/2007 |
| JP | 2008-541689 A | 11/2008 |
| JP | 2011-130577 A | 6/2011 |
| JP | 2014-087134 A | 5/2014 |

OTHER PUBLICATIONS

Form PCT/ISA/237 for corresponding International Application No. PCT/JP2014/002178 dated Jun. 17, 2014.
Extended European Search Report dated Oct. 27, 2016 for corresponding European Application No. 14788920.8.
Krismer et al., "A Comparative Evaluation of Isolated Bi-directional DC/DC Converters with Wide Input and Output Voltage Range", IEEE 2005, pp. 599-606.
Li et al., "An Adaptive Dead-time Control Scheme for High-Switching-Frequency Dual-Active-Bridge Converter", IEEE, 2012, pp. 1355-1361.

\* cited by examiner

BIDIRECTIONAL DC/DC CONVERTER

TECHNICAL FIELD

This invention generally relates to bidirectional DC/DC converters, and specifically relates to an LLC-type bidirectional DC/DC converter.

BACKGROUND ART

Heretofore, there have been bidirectional DC/DC converters that perform power conversion on DC voltages bi-directionally.

In bidirectional DC/DC converters in Patent Documents 1 and 2, a winding of a transformer is connected to a full-bridge switching circuit that includes four sets (eight in total) of switching elements. An LLC full-bridge-type converter is configured by connecting in series an LC resonance circuit constituted by a resonance inductor and a resonance capacitor to the winding of the transformer.

The direction of a resonance current that flows in the LC resonance circuit is periodically inverted by the switching circuit being turned on and off. In the bidirectional DC/DC converter, the waveform of a switching current is shaped like a sinewave by the LC resonance circuit, and the timing at which the switching elements are turned off are set in the vicinity of zero crossings of the switching current.

CITATION LIST

Patent Literature

Patent Document 1: JP 2004-282828A
Patent Document 2: JP 2008-541689A

SUMMARY OF INVENTION

Technical Problem

In the bidirectional DC/DC converters in Patent Documents 1 and 2, a dead time is provided during which the four sets of switching elements in the switching circuit are kept in an off state simultaneously. However, during the dead time, resonance occurs between the resonance inductor and capacitors that exist in parallel to the respective switching elements, and high-frequency noise is generated. Note that the capacitor that exists in parallel to the switching element is a parasitic capacitance of the switching element, a capacitor for surge protection, or the like, for example.

Also, when the switching circuits on primary and secondary sides of the transformer are driven in full synchronization as described in Patent Document 1, it is difficult to turn on the switching elements at zero crossings of voltages on the primary and secondary sides due to the resonance phenomenon described above. Therefore, hard switching occurs.

Accordingly, in order to suppress loss that is generated due to the hard switching, adjustment is needed which causes the dead time to be lengthened.

That is to say, the high-frequency noise generated during the dead time has been a cause of degradation in the efficiency of the bidirectional DC/DC converter.

The present invention has been made in view of the above-described problems, and an object of the present invention is to provide a bidirectional DC/DC converter having a suppressed high-frequency noise during dead time and an improved efficiency.

Solution to Problem

A bidirectional DC/DC converter according to the present invention is configured to perform bidirectional voltage conversion in which an operation is switched between a first operation of converting a DC voltage received through first terminals into a DC voltage and outputting the converted DC voltage through second terminals, and a second operation of converting a DC voltage received through the second terminals into a DC voltage and outputting the DC voltage through the first terminals. The bidirectional DC/DC converter includes: a first switching circuit; a series circuit of a resonance inductor, a resonance capacitor, and a first winding of a transformer; a second switching circuit; a second winding of the transformer; rectifying elements; and a controller. The first switching circuit is constituted by a series circuit of first and second switching elements connected between the first terminals and a series circuit of third and fourth switching elements connected between the first terminals. The resonance inductor, the resonance capacitor, and the first winding of the transformer are connected between a connection point of the first and second switching elements and a connection point of the third and fourth switching elements. The second switching circuit is constituted by a series circuit of fifth and sixth switching elements connected between the second terminals and a series circuit of seventh and eighth switching elements connected between the second terminals. The second winding of the transformer is connected between a connection point of the fifth and sixth switching elements and a connection point of the seventh and eighth switching elements. The rectifying elements are respectively connected in parallel to the first to eighth switching elements such that the rectifying elements are reversely biased when receiving an input DC voltage. The controller is configured to control, in the first operation, the first to fourth switching elements such that two switching element sets, each of which includes two switching elements positioned diagonally in a full-bridge, are alternatingly turned on with a dead time being provided. The controller is configured to control, in the second operation, the fifth to eighth switching elements such that two switching element sets, each of which includes two switching elements positioned diagonally in a full-bridge, are alternatingly turned on with the dead time being provided. During the dead time, a resonance current generated by a load current that flows in the resonance inductor and a resonance current generated by an excitation current of the transformer flow in the resonance circuit constituted by the resonance inductor and capacitors that exist in parallel to the respective first to eighth switching elements. The controller is configured to perform a turning off operation on the first to eighth switching elements at a timing at which the resonance current generated by the load current and the resonance current generated by the excitation current are cancelled out by each other during the dead time.

In the present invention, it is preferable that the bidirectional DC/DC converter further includes a current meter configured to measure the load current, and the controller is configured to perform a turning off operation on the first to eighth switching elements when a measured value of the load current measured by the current meter reaches a predetermined threshold.

In the present invention, it is preferable that an inductance of the resonance inductor, a capacitance of the resonance capacitor, and the dead time are set such that the controller turns off the first to eighth switching elements at the timing at which the resonance current generated by the load current and the resonance current generated by the excitation current are cancelled out by each other.

Advantageous Effects of Invention

As described above, in the present invention, since the resonance phenomenon generated by the excitation current and the resonance phenomenon generated by the load current can be cancelled out by each other, resonance noise can be reduced. Also, as a result of the resonance noise being reduced during the dead time, the zero crossing switching can be performed without extending the dead time. That is, the present invention has an effect of suppressing high-frequency noise generated during the dead time, thereby improving efficiency.

DESCRIPTION OF EMBODIMENTS

Hereinafter, embodiments of the present invention will be described with reference to the drawings.

Embodiment 1

Figure 1:
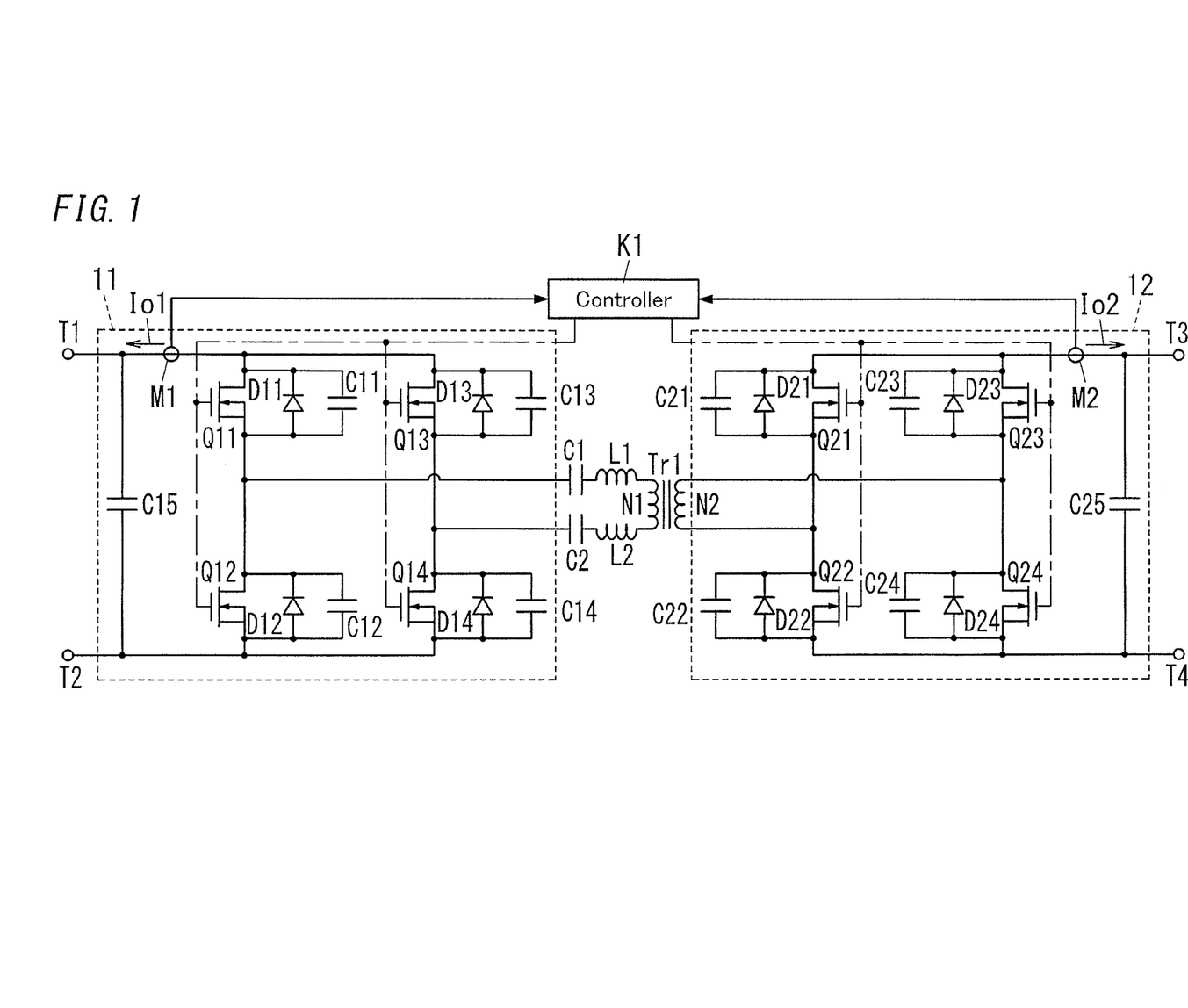
FIG. 1 is a circuit diagram illustrating a bidirectional DC/DC converter of Embodiment 1.

FIG. 1 illustrates a circuit configuration of a bidirectional DC/DC converter of the present embodiment. The bidirectional DC/DC converter is constituted by an LLC full-bridge-type converter. The bidirectional DC/DC converter includes a switching circuit 11, a high-frequency transformer Tr1, a switching circuit 12, resonance inductors L1 and L2, resonance capacitors C1 and C2, and a controller K1.

The switching circuit 11 includes a parallel circuit in which series-connected switching elements Q11 and Q12 and series-connected switching elements Q13 and Q14 are connected in parallel, and the parallel circuit is connected between terminals T1 and T2 (between first terminals).

The switching elements Q11 and Q14 are positioned diagonally in a full-bridge, and the switching elements Q12 and Q13 are positioned diagonally in the full-bridge. Capacitors C11 to C14 for surge protection are respectively connected in parallel to the switching elements Q11 to Q14, and diodes D11 to D14 (rectifying elements) are also respectively connected thereto in parallel such that the diodes are reversely biased when receiving an input DC voltage (connected in inverse parallel). A series circuit of a first winding N1 of the high-frequency transformer Tr1, the resonance inductors L1 and L2, and the resonance capacitors C1 and C2 is connected between a connection point of the switching elements Q11 and Q12 and a connection point of the switching elements Q13 and Q14. Also, a smoothing capacitor C15 is connected between the terminals T1 and T2. Note that the switching elements Q11 to Q14 respectively correspond to first to fourth switching elements.

Next, the switching circuit 12 includes a parallel circuit in which series-connected switching elements Q21 and Q22 and series-connected switching elements Q23 and Q24 are connected in parallel, and the parallel circuit is connected between terminals T3 and T4 (between second terminals). The switching elements Q21 and Q24 are positioned diagonally in a full-bridge, and the switching elements Q22 and Q23 are positioned diagonally in the full-bridge. Capacitors C21 to C24 for surge protection are respectively connected in parallel to the switching elements Q21 to Q24, and diodes D21 to D24 (rectifying elements) are also respectively connected in inverse parallel thereto. A second winding N2 is connected between a connection point of the switching elements Q21 and Q22 and a connection point of the switching elements Q23 and Q24. Also, a smoothing capacitor C25 is connected between the terminals T3 and T4. Note that the switching elements Q21 to Q24 respectively correspond to fifth to eighth switching elements.

Also, a current meter M1 configured to measure a load current Io1 that flows toward the terminal T1 is provided in a high voltage-side current path from the first winding N1 to the capacitor C15. Also, a current meter M2 configured to measure a load current Io2 that flows toward the terminal T3 is provided in a high voltage-side current path from the second winding N2 to the capacitor C25. The measurement data of the current meters M1 and M2 are outputted from the current meters M1 and M2 to the controller K1.

The controller K1 is configured to perform turning on and off control on the switching elements Q11 to Q14 and the switching elements Q21 to Q24, and as a result power conversion is performed. The power conversion in which a DC voltage resulting from DC/DC conversion of the DC voltage inputted between the terminals T1 and T2 is outputted between the terminals T3 and T4 is referred to as a first operation. The power conversion in which a DC voltage resulting from DC/DC conversion of the DC voltage inputted between the terminals T3 and T4 is outputted between the terminals T1 and T2 is referred to as a second operation.

For example, in the first operation, assuming that the input voltage between the terminals T1 and T2 is Vi1 and that the number of turns of the first winding N1: the number of turns of the second winding N2 is n:1, the output voltage Vo1 between the terminals T3 and T4 is Vi1/n. Also, in the second operation, assuming that the input voltage between the terminals T3 and T4 is Vi2 and that the number of turns of the first winding N1: the number of turns of the second winding N2 is n:1, the output voltage Vo1 between the terminals T1 and T2 is n×Vi2.

Hereinafter, a case will be illustrated in which the switching circuits 11 and 12 are driven in full synchronization in a power conversion (second operation) in which a DC voltage resulting from DC/DC conversion of the DC voltage between the terminals T3 and T4 is outputted between the terminals T1 and T2.

When the switching circuits 11 and 12 are driven in full synchronization, the controller K1 performs driving for alternatingly turning on a set of the switching elements Q11, Q14, Q22, and Q23 and a set of the switching elements Q12, Q13, Q21, and Q24. That is, the switching elements Q11, Q14, Q22, and Q23 are simultaneously turned on and off, and the switching elements Q12, Q13, Q21, and Q24 are simultaneously turned on and off. Note that the set of switching elements Q11, Q14, Q22, and Q23 and the set of switching elements Q12, Q13, Q21, and Q24 are each referred to as a switching element group.

The controller K1 provides a dead time between a period in which the set of switching elements Q11, Q14, Q22, and Q23 are in an on state and a period in which the set of switching elements Q12, Q13, Q21, and Q24 are in an on state. In the dead time, all the switching elements Q11 to Q14 and Q21 to Q24 are kept in an off state.

In each of cases that the set of switching elements Q11, Q14, Q22, and Q23 are in an on state and that the set of switching elements Q12, Q13, Q21, and Q24 are in an on state, resonance occurs between the resonance capacitors C1 and C2 and the resonance inductors L1 and L2, which causes a load current Io1 having a sinewave-like shape to flow in the output side (in the first winding N1 side) circuit.

Specifically, after the controller K1 turns on one of the switching element groups (one of the set of switching elements Q11, Q14, Q22, and Q23 and the set of switching elements Q12, Q13, Q21, and Q24), a load current Io (Io1 or Io2) increases and then decreases in a sinewave-like shape. When the measured value (absolute value) of the load current To measured by the current meter M1 or M2 decreases to a predetermined threshold X1 after passing a maximum value, the controller K1 turns off the one switching element group that is currently turned on. Then, upon the elapse of the dead time in which all the switching elements Q11 to Q14 and Q21 to Q24 are kept in an off state, the controller K1 turns on the other switching element group. When the measured value of the load current To decreases to the predetermined threshold X1 after passing a maximum value, the controller K1 turns off the other switching element group that is currently turned on. Thereafter, the controller K1 repeats turning on of the one switching element group and the other switching element group alternatingly with the dead time being interposed therebetween.

Figure 2:
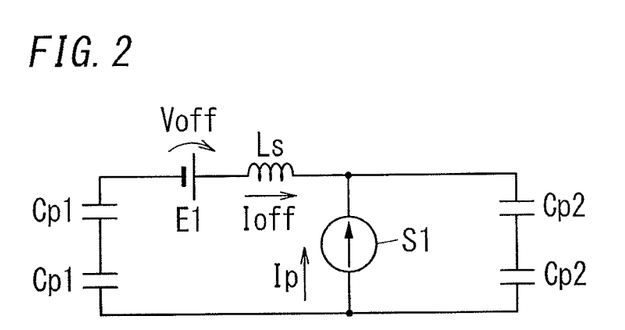
FIG. 2 is a circuit diagram illustrating an equivalent circuit of the bidirectional DC/DC converter of Embodiment 1 in a dead time.

The threshold X1 for determining the timing of turning off described above will be described with reference to an equivalent circuit shown in FIG. 2. FIG. 2 illustrates an equivalent circuit of the bidirectional DC/DC converter during the dead time, in which all the switching elements Q11 to Q14 and Q21 to Q24 are kept in an off state.

Note that the equivalent circuit shown in FIG. 2 is an equivalent circuit of the bidirectional DC/DC converter during dead time immediately after the set of switching elements Q12, Q13, Q21, and Q24 is turned off.

First, assuming that the resonance inductors L1 and L2 are combined to be a resonance inductor Ls, a load current Io1=Ioff flows in the resonance inductor Ls immediately after the set of switching elements Q12, Q13, Q21, and Q24 is turned off. Also, because the capacitance of each of the resonance capacitors C1 and C2 is sufficiently larger than the capacitance of each of the capacitors C11 to C14 and C21 to C24, the resonance capacitor C1 or C2 is approximated as a voltage source E1 having a voltage Voff, which is a charged voltage of the resonance capacitor. Also, because the magnetizing inductance Lp of the high-frequency transformer Tr1 is designed to be sufficiently larger than that of the resonance inductor Ls, the magnetizing inductance Lp of the high-frequency transformer Tr1 is approximated as a current source S1 that causes an excitation current Ip to flow immediately after the set of switching elements Q12, Q13, Q21, and Q24 is turned off.

Furthermore, since the switching elements Q11 to Q14 and Q21 to Q24 are all in an off state during the dead time, the currents that flow in the switching elements Q11 to Q14 and Q21 to Q24 need not be considered. Also, the resonance during the dead time is sufficiently small in the present embodiment as will be described later, and thus hardly any current flows in the diodes D11 to D14 and D21 to D24 that are respectively connected in parallel to the switching elements Q11 to Q14 and Q21 to Q24. Therefore, the currents that flow in the diodes D11 to D14 and D21 to D24 need not be considered.

Also, the terminals T1, T2, T3, and T4 each have fixed potential. Therefore, when focusing on only an AC signal, parasitic capacitors of the respective switching elements Q11 to Q14 and Q21 to Q24 are connected in parallel to the respective capacitors C11 to C14 and C21 to C24. Note that in the equivalent circuit in FIG. 2, the capacitance obtained by combining the capacitance of one of the capacitors C11 to C14, which are respectively connected in parallel to the switching elements Q11 to Q14, and the parasitic capacitance of the parasitic capacitor of the one of the switching elements Q11 to Q14 corresponding thereto is assumed to be Cp1. Also, in the equivalent circuit in FIG. 2, the capacitance obtained by combining the capacitance of one of the capacitors C21 to C24, which are respectively connected in parallel to the switching elements Q21 to Q24, and the parasitic capacitance of the parasitic capacitor of the one of the switching elements Q21 to Q24 corresponding thereto is assumed to be Cp2.

In the equivalent circuit in FIG. 2, a resonance circuit is formed by the resonance inductor Ls and the combined capacitances Cp1 on an input side and the combined capacitances Cp2 on an output side. Resonance noise is generated in a period of dead time by this resonance circuit. Origins of the resonance noise include a load current Ioff that is flowing in the resonance inductor Ls at the time of turning off, a voltage Voff of the voltage source E1 at the time of turning off, and an excitation current Ip of the current source S1 at the time of turning off.

Note that, by employing a sufficiently large capacitance as each of the resonance capacitors C1 and C2, the resonance caused by the voltage Voff can be reduced. In this case therefore, during the dead time, a resonance current generated by the load current Ioff and a resonance current generated by the excitation current Ip flow in the resonance circuit formed by the resonance inductor Ls, the combined capacitances Cp1, and the combined capacitances Cp2. Note that the voltages of the combined capacitances Cp1 and Cp2 do not cause resonance noise, because the charged voltage of the combined capacitance Cp1 takes an equivalent value as the charged voltage of the combined capacitance Cp2.

Because the resonance generated by the load current Ioff and the resonance generated by the excitation current Ip are in phase, the resonance influences can be cancelled out by each other. The threshold X1, which is a magnitude of the load current Ioff at which the resonance influences can be cancelled out by each other, can be expressed by the following equation.

$$X1 = Ip \times \{Cp1/\{Cp1+(Cp2/n^2)\}\} \quad (1)$$

Note that the excitation current Ip can be calculated from the input voltage between the terminals T3 and T4 and the magnetizing inductance Lp of the high-frequency transformer Tr1. Then, the value of the threshold X1 is stored in the controller K1.

In the embodiment, the controller K1 is configured to turn off the switching elements Q12, Q13, Q21, and Q24 when the measured value of the load current Io1 measured by the current meter M1 decreases to the threshold X1 after increase. According to the embodiment, since the turning off timing of the switching elements Q12, Q13, Q21, and Q24 are set to a timing at which Io1 is equal to X1, the resonance current generated by the load current Ioff can cancel out the resonance current generated by the excitation current Ip. Therefore, the resonance noise after turning off can be reduced.

In a case where the resonance noise can be ignored, only the excitation current Ip flows in the high-frequency transformer Tr1 during the dead time. Therefore, during the dead time, the change of the voltage across each of the switching elements Q21 to Q24 on the input side becomes in phase with the change of the voltage across each of the switching elements Q11 to Q14 on the output side. Accordingly, the voltages across the respective switching elements Q11, Q14, Q22, and Q23 (voltages each between a drain and a source), which will be simultaneously turned on next, become zero at the same timing. Therefore, the control portion K1 can perform zero crossing switching for turning on of the switching elements Q11, Q14, Q22, and Q23. Also, in the controller K1, the timing of turning off of the switching elements Q11, Q14, Q22, and Q23 are set at a timing at which Io2 is equal to X1, and thus resonance noise after turning off of them also can be reduced.

That is to say, the controller K1 is configured to turn off the switching element group at the timing at which the resonance current generated by the load current Ioff and the resonance current generated by the excitation current Ip are cancelled out by each other during the dead time. Therefore, since the controller K1 can cause the resonance phenomenon caused by the excitation current Ip and the resonance phenomenon caused by the load current Ioff to cancel out each other, resonance noise can be reduced. Therefore, the bidirectional DC/DC converter can suppress high-frequency noise generated during the dead time.

Also, as a result of the resonance noise during the dead time being reduced, the set of switching elements Q11, Q14, Q22, and Q23 and the set of switching elements Q12, Q13, Q21, and Q24 can be turned on at the zero crossing points of the voltages across the respective switching elements. Therefore, the bidirectional DC/DC converter can perform zero crossing switching in both the output and input sides without the dead time being extended, thus improving efficiency.

Also, in a power conversion (first operation) in which a DC voltage resulting from DC/DC conversion of the DC voltage between the terminals T1 and T2 is outputted between the terminals T3 and T4, the same effect can be obtained by configuring the operation similarly to the case of the second operation as described above.

Also, the positions of the current meters M1 and M2 are not specifically limited, as long as the load currents Io1 and Io2 can be measured. Also the circuit configuration of the bidirectional DC/DC converter is not specifically limited as long as the bidirectional DC/DC converter is configured as the LLC-type bidirectional DC/DC converter.

Embodiment 2

Figure 3:
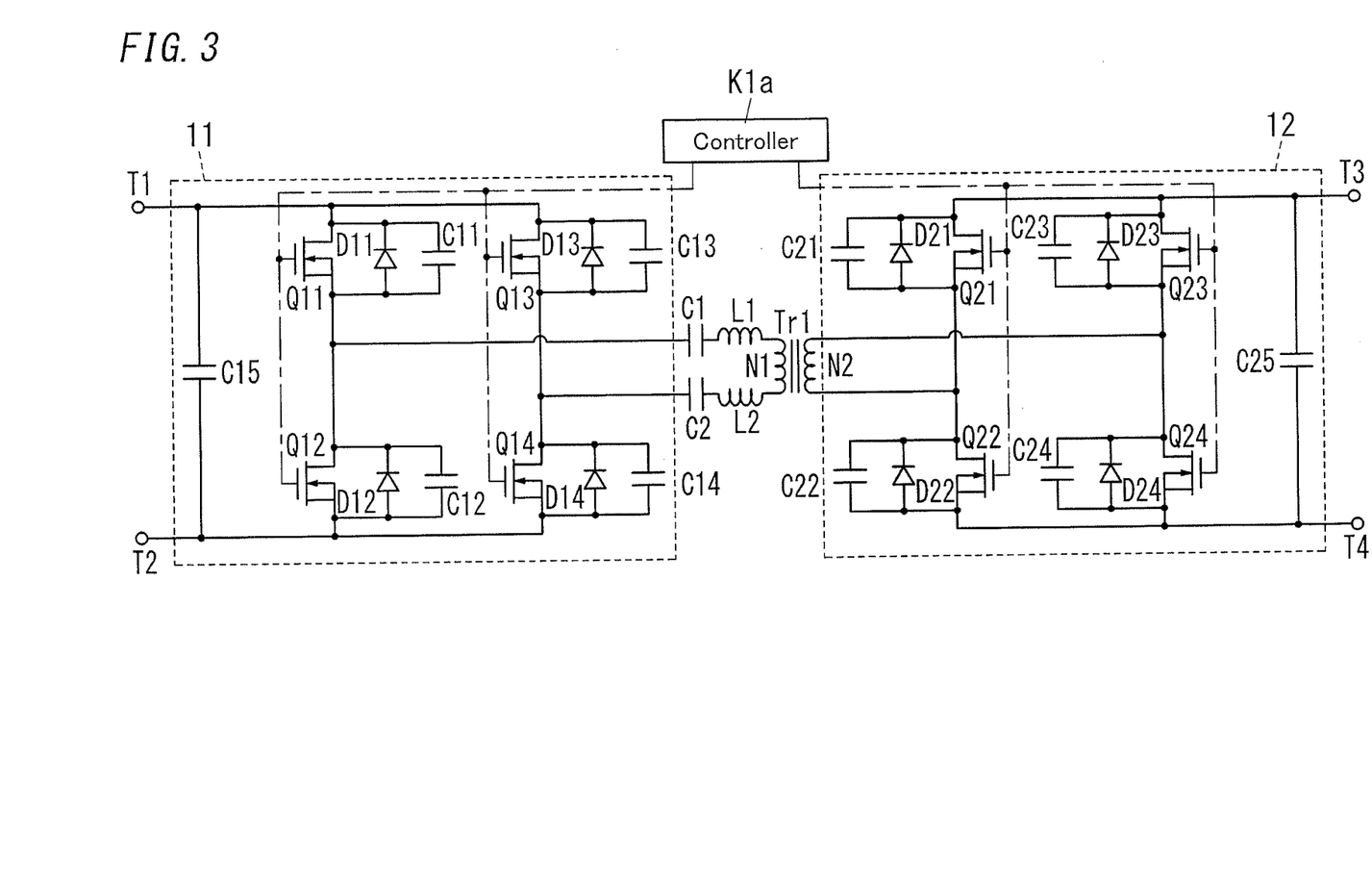
FIG. 3 is a circuit diagram illustrating a bidirectional DC/DC converter of Embodiment 2.

FIG. 3 shows a circuit configuration of a bidirectional DC/DC converter of the present embodiment. In the circuit configuration of the bidirectional DC/DC converter of the present embodiment, the current meters M1 and M2 are omitted from the configuration of Embodiment 1. The other configurations are similar to Embodiment 1, and thus constituent elements similar to those in Embodiment 1 are provided with the same reference numerals, and description thereof will be omitted.

A controller K1a is configured to turn off a switching element group at a timing at which a resonance current generated by a load current Ioff and a resonance current generated by an excitation current Ip are cancelled out by each other during dead time. In the bidirectional DC/DC converter, inductances of resonance inductors L1 and L2, capacitances of resonance capacitors C1 and C2, and the dead time are set such that the switching element group is turned off at the timing described above.

Specifically, assume that $f_{SW}$ denotes the switching frequency, $f_{LC}$ denotes the resonance frequency of the resonance due to the resonance inductors L1 and L2 and resonance capacitors C1 and C2, and DT denotes the length of the dead time. In this case, the inductances of the resonance inductors L1 and L2, the capacitances of the resonance capacitors C1 and C2, and the dead time are set such that the following Equation (2) is satisfied.

$$1/f_{SW} = 1/f_{LC} + 2 \times D_T \quad (2)$$

Switching circuits 11 and 12 are switched at the switching frequency $f_{SW}$ that satisfies Equation (2) under the control of the controller K1a. Accordingly, the controller K1a can turn off the switching element group at the timing at which the resonance current generated by the load current Ioff and the resonance current generated by the excitation current Ip are cancelled out by each other during the dead time. Therefore, since the controller K1a can cancel the resonance phenomenon caused by the excitation current Ip and the resonance phenomenon caused by the load current Ioff each other, resonance noise can be reduced. Therefore, the bidirectional DC/DC converter can suppress high-frequency noise generated during the dead time.

Also, as a result of the resonance noise during the dead time being reduced, a set of switching elements Q11, Q14, Q22, and Q23 and a set of switching elements Q12, Q13, Q21, and Q24 can be turned on at the zero crossing points of the voltages across the respective switching elements. Therefore, the bidirectional DC/DC converter can perform zero crossing switching in both the output and input sides without the dead time being extended, thus improving efficiency.

Also, since the current meters M1 and M2 need not to be used, the circuit configuration can be simplified.

Also the circuit configuration of the bidirectional DC/DC converter is not specifically limited as long as the bidirectional DC/DC converter is configured as the LLC-type bidirectional DC/DC converter.

Also, in the embodiments described above, in the first operation, the controller K1 or the controller K1a may drive alternatingly to turn on the switching elements Q11 and Q14 and the switching elements Q12 and Q13, and keep the switching elements Q21 to Q24 in an off state. In this case, the switching circuit 11 functions as a switching circuit in which a high-frequency transformer Tr1 side is the output side, and the switching circuit 12 functions as a rectification circuit in which a high-frequency transformer Tr1 side is the input side. The timing of turning off of the switching elements Q11 to Q14 is set similarly to Embodiment 1 or 2.

Also, in the embodiments described above, in the second operation, the controller K1 or the controller K1a may perform driving for alternatingly turning on the switching elements Q21 and Q24 and the switching elements Q22 and Q23, and keep the switching elements Q11 to Q14 in an off state. In this case, the switching circuit 12 functions as a switching circuit in which a high-frequency transformer Tr1 side is the output side, and the switching circuit 11 functions as a rectification circuit in which a high-frequency transformer Tr1 side is the input side. The timing of turning off of the switching elements Q21 to Q24 is set similarly to Embodiment 1 or 2.

Note that the embodiments described above are examples of the present invention. The present invention is not limited to the embodiments described above, and it should be obvious that, in addition to the above embodiments, various modifications can be made according to the design or the like, as long as they do not depart from the technical concept of the present invention.

Summary

As described above, the DC/DC converter of Embodiment 1 or Embodiment 2 performs bidirectional voltage conversion by switching between the first operation and the second operation. The first operation is an operation of outputting, through the second terminals, a DC voltage resulting from DC/DC conversion of a DC voltage received through the terminals T1 and T2 (first terminals). The second operation is an operation of outputting, through the first terminals, a DC voltage resulting from DC/DC conversion of a DC voltage received through the terminals T3 and T4 (second terminals). The DC/DC converter includes the switching circuit 11 (first switching circuit) and the series circuit of the resonance inductors L1 and L2, the resonance capacitors C1 and C2, and the first winding N1 of the high-frequency transformer Tr1. Furthermore, the DC/DC converter includes the switching circuit 12 (second switching circuit), the second winding N2 of the transformer Tr1, the diodes D11 to D14 and D21 to D24 (rectifying elements), and the controller K1 or the controller K1a. The switching circuit 11 is constituted by two series circuits. One of the two series circuits is the series circuit of the switching elements Q11 and Q12 (first and second switching elements) connected between the terminals T1 and T2. The other is the series circuit of the switching elements Q13 and Q14 (third and fourth switching elements) connected between the terminals T1 and T2. The resonance inductors L1 and L2, the resonance capacitors C1 and C2, and the first winding N1 of the high-frequency transformer Tr1 are connected between the connection point of the switching elements Q11 and Q12 and the connection point of the switching elements Q13 and Q14. The switching circuit 12 is constituted by two series circuits. One of the two series circuits is the series circuit of the switching elements Q21 and Q22 (fifth and sixth switching elements) connected between the terminals T3 and T4. The other is the series circuit of the switching elements Q23 and Q24 (seventh and eighth switching elements) connected between the terminals T3 and T4. The second winding N2 is connected between the connection point of the switching elements Q21 and Q22 and the connection point of the switching elements Q23 and Q24. The diodes D11 to D14 and D21 to D24 are respectively connected in inverse parallel to the switching elements Q11 to Q14 and Q21 to Q24. The controller K1 or the controller K1a controls, in the first operation, the switching elements Q11 to Q14 such that two switching elements sets, each of which includes two switching elements positioned diagonally in the full-bridge, are alternatingly turned on with the dead time being provided. The controller K1 or the controller K1a controls, in the second operation, the switching elements Q21 to Q24 such that two switching elements sets, each of which includes two switching elements positioned diagonally in the full-bridge, are alternatingly turned on with the dead time being provided. During the dead time, the resonance current generated by the load current Ioff that flows in the resonance inductors L1 and L2 and the resonance current generated by the excitation current Ip of the transformer Tr1 flow in the resonance circuit constituted by the resonance inductors L1 and L2 and the capacitors that exist in parallel to the respective switching elements Q11 to Q14 and Q21 to Q24. The controller K1 or the controller K1a is configured to perform the turning off operation on the switching elements Q11 to Q14 and Q21 to Q24 at the timing at which the resonance current generated by the load current Ioff and the resonance current generated by the excitation current Ip are cancelled out by each other during the dead time.

The DC/DC converter of Embodiment 1 may further include the current meters M1 and M2 for measuring the load current. The controller K1 may be configured to perform the turning off operation on the switching elements Q11 to Q14 and Q21 to Q24 when the measured value of the load current Ioff measured by the current meter M1 or M2 reaches a predetermined threshold X1.

In the DC/DC converter of Embodiment 2, the inductances of the resonance inductors L1 and L2, the capacitances of the resonance capacitors C1 and C2, and the dead time may be set such that the controller K1a performs the following operation. The controller K1a turns off the switching elements Q11 to Q14 and Q21 to Q24 at the timing at which the resonance current generated by the load current Ioff and the resonance current generated by the excitation current Ip are cancelled out by each other.

The invention claimed is:
1. A bidirectional DC/DC converter configured to perform bidirectional voltage conversion in which an operation is switched between a first operation of outputting a DC voltage resulting from DC/DC conversion of a DC voltage received through first terminals, through second terminals, and a second operation of outputting a DC voltage resulting from DC/DC conversion of a DC voltage received through the second terminals, through the first terminals, the bidirectional DC/DC converter comprising:
    a first switching circuit that is a full-bridge circuit constituted by a series circuit of first and second switching elements connected between the first terminals and a series circuit of third and fourth switching elements connected between the first terminals;
    a series circuit of a resonance inductor, a resonance capacitor, and a first winding of a transformer, the series circuit being connected between a connection point of the first and second switching elements and a connection point of the third and fourth switching elements;
    a second switching circuit that is a full-bridge circuit constituted by a series circuit of fifth and sixth switching elements connected between the second terminals and a series circuit of seventh and eighth switching elements connected between the second terminals;
    a second winding of the transformer connected between a connection point of the fifth and sixth switching elements and a connection point of the seventh and eighth switching elements;
    rectifying elements that are respectively connected in parallel to the first to eighth switching elements in order that the rectifying elements are reversely biased when receiving an input DC voltage; and
    a controller configured
        to control, in the first operation, the first to fourth switching elements in order that two switching element sets, each of which includes two switching elements positioned diagonally in the full-bridge, are alternatingly turned on with a dead time being provided, and
        to control, in the second operation, the fifth to eighth switching elements in order that two switching element sets, each of which includes two switching elements positioned diagonally in the full-bridge, are alternatingly turned on with the dead time being provided,
    during the dead time, a resonance current generated by a load current flowing in the resonance inductor and a resonance current generated by an excitation current of the transformer flowing in the resonance circuit constituted by the resonance inductor and capacitors coupling in parallel to the respective first to eighth switching elements, the controller being configured to perform a turning off operation on the first to eighth switching elements at a timing at which the resonance current generated by the load current and the resonance current generated by the excitation current are cancelled out by each other during the dead time.

2. The bidirectional DC/DC converter according to claim 1, further comprising a current meter configured to measure the load current, wherein the control portion is configured to perform a turning off operation on the first to eighth switching elements when a measured value of the load current measured by the current meter reaches a predetermined threshold.

3. The bidirectional DC/DC converter according to claim 1, wherein an inductance of the resonance inductor, a capacitance of the resonance capacitor, and the dead time are set first to eighth switching elements in order that the control portion turns off the first to eighth switching elements at the timing at which the resonance current generated by the load current and the resonance current generated by the excitation current are cancelled out by each other.

\* \* \* \* \*